United States Patent
Johansen

[15] 3,651,307
[45] Mar. 21, 1972

[54] ROOM-TEMPERATURE REGULATOR FOR ELECTRIC HEATERS

[72] Inventor: Oddvar Johansen, Trondheim, Norway
[73] Assignee: Nobo Fabrikker A/S, Trondheim, Norway
[22] Filed: Oct. 13, 1970
[21] Appl. No.: 80,319

[30] Foreign Application Priority Data

Oct. 13, 1969  Norway .............................. 4076/69
Oct. 20, 1969  Norway .............................. 4155/69

[52] U.S. Cl. .......................................................... 219/505
[51] Int. Cl. .......................................................... H05b 1/02
[58] Field of Search ........................ 219/499, 501, 505, 504; 337/107, 104; 73/362 R

[56] References Cited

UNITED STATES PATENTS 3,371,231  2/1968  Burley ............................. 219/501 X
3,456,095  7/1969  Fox ................................... 219/501
2,499,906  3/1950  Crise ................................. 337/102

FOREIGN PATENTS OR APPLICATIONS 829,314  3/1960  Great Britain .................... 337/377

Primary Examiner—Bernard A. Gilheany
Assistant Examiner—F. E. Bell
Attorney—Cushman, Darby & Cushman

[57] ABSTRACT

A temperature controlled regulator for electric heaters with a thermostat having an acceleration resistance and a balancing resistance, the current through the balancing resistance being controlled by a thermistor which is subjected to the temperature of the heater in such a manner that the supply of heat from the balancing resistance to the thermostat will be large with little heat requirement and little when the heat requirement is great in the room to be heated.

3 Claims, 2 Drawing Figures

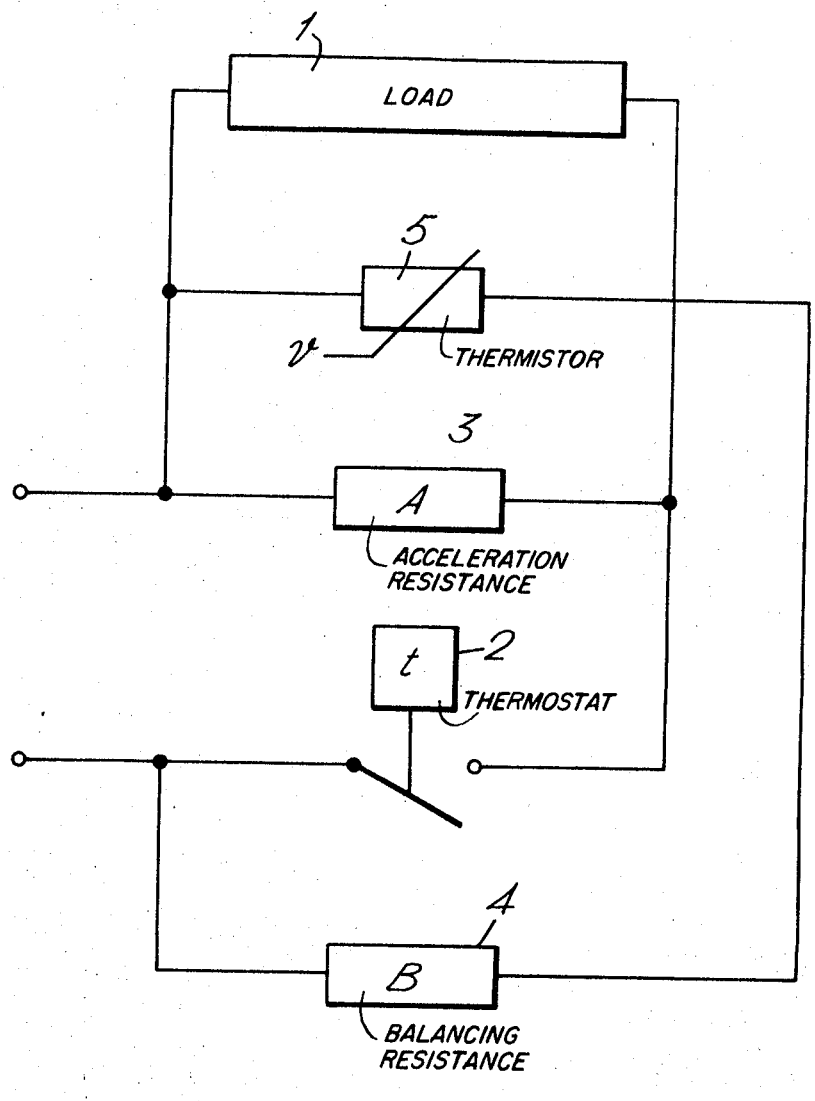

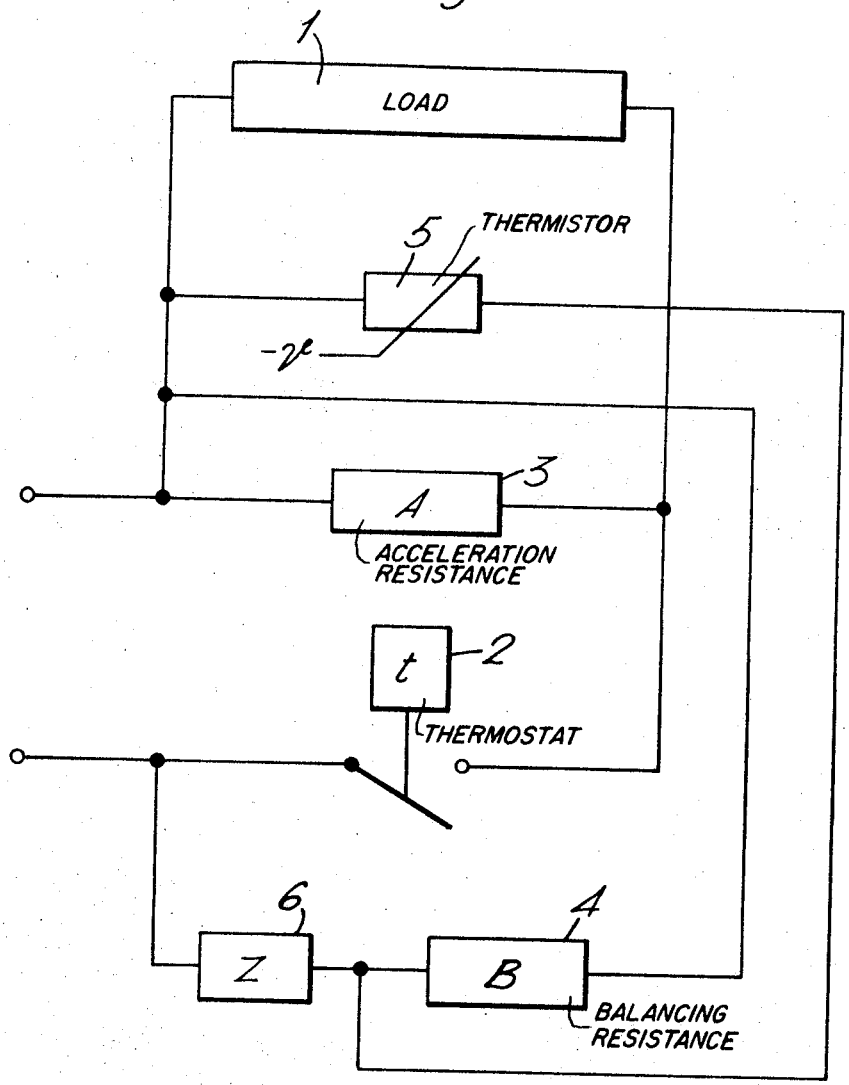

ROOM-TEMPERATURE REGULATOR FOR ELECTRIC HEATERS

The present invention relates to an improvement in a room-temperature regulator for electric heaters, comprising a thermostat which connects and disconnects the heater at a predetermined temperature and an acceleration resistance which is connected together with the heater and is intended to furnish heat to the thermostat. The principle of utilizing an acceleration resistance to reduce the cycle period of the thermostat is known. The resistance is coupled parallel to the load of the heater and is thus controlled by the thermostat. It is also known from British Pat. No. 829.314 to utilize a compensation element to equalize the tendency of the heat effect on the thermostat to alter the room-temperature by a change in the heat requirement. The said element operates only when the heater and the acceleration resistance are not connected, and the compensation element is baked into a ceramic mass in order to equalize the heat effect on the thermostat and to make the compensation element as inert as the actual heater.

The aim of the present invention is to provide a simple and operationally sure arrangement in room-temperature regulators thereby achieving a more directly effective and immediate adaptation of the cycle period of the thermostat to the heat requirement. The heat requirement may be said simply to be in a determined relation to the difference between the room temperature and the temperature at which the room temperature regulator is set.

In accordance with the invention the adaptation of the cycle period to the heat requirement is provided in that, in addition to the heat yield from the room, heating of the thermostat is made dependent on the said difference in temperature. If the temperature difference is slight (that is to say little heat requirement) only a brief period of time is needed to heat the thermostat and, after connection, it is quickly disconnected. With greater difference between the room-temperature and the temperature at which the thermostat is set, the heat feedback to the thermostat, in addition to the heat supply to the room, will be less and the thermostat will remain connected for a longer period of time due to the heat from the acceleration resistance, and components used in accordance with the invention will again disconnect the heater.

In known arrangements, the elements that heat the thermostat, supply a constant amount of heat, in addition to heat from the actual room, while the said heat amount in accordance with the invention is varied according to the heat requirement.

According to the invention, the adaptation of the heat supply to the thermostat in accordance with the heat requirement is supplied by means of a balancing resistance which is connected together with a thermistor in such a manner that the current through the balancing resistance, and thereby the supply of heat to the thermostat, will be high when the room-temperature is high (little heat requirement) and low at low temperature (great heat requirement).

A thermistor is an electric component having the property that the resistance varies with the temperature, and a thermistor with positive characteristic has little resistance at low temperature and high resistance at high temperature, while a thermistor with negative characteristic has high resistance at low temperature and low resistance at high temperature. Both types of thermistors can be used in the present invention.

The characterizing feature of the invention is thus primarily a balancing resistance disposed in cooperation with the acceleration resistance and a thermistor controlled by the temperature of the heater, said thermistor being connected to the balancing resistance, so that the heat supply thereof to the thermostat will be great when the heat requirement is slight and small when the heat requirement in the room to be heated is great.

An expedient embodiment example is characterized in that the thermistor, when it has a negative temperature coefficient, is connected in parallel with the balancing resistance and that the parallel connection is connected in series with a reactance.

In order that the invention may be more readily understood, it is further defined in the following with reference to the drawing where:

FIG. 1 shows a connection diagram for a temperature regulator effected in accordance with the invention, with the thermistor as positive temperature coefficient and FIG. 2 shows a connection diagram for a corresponding temperature regulator where the thermistor has a negative coefficient.

The load 1 on FIG. 1 is an electric heater, 2 indicating a thermostat which connects and disconnects the heater 1 to and from the current source at determined temperature. In manner known per se, an accelerating resistance 3 is connected in parallel to the heater 1 the said acceleration resistance 3, when the heater 1 is connected, supplying heat to the thermostat 2 in order that the said thermostat shall have a shorter cycle period than would be possible without the acceleration resistance. The cycle period is the period of time from the connection at a determined temperature of the thermostat to the disconnection of the thermostat, influenced partly by the acceleration resistance and partly by the temperature prevailing in the room.

In accordance with the invention, a balancing resistance 4 is arranged, in addition to the acceleration resistance 3, for heating of the thermostat 2, and the balancing resistance 4 is connected in series with a thermistor 5 and is permanently connected, the acceleration resistance 3 being connected and disconnected, together with the heater 1.

In the example shown, the thermistor 5 has a positive temperature coefficient and will, by means of its location adjacent the heater or the acceleration resistance 3, sense a temperature which indicates the heat requirement. The heater 1 will have a higher temperature on great heat requirement and lower temperature on little heat requirement. By reason of its positive characteristic the thermistor 5 has a low resistance at the low temperature of the heater on low heat requirement, and low resistance in the thermistor 5 means greater current through the said thermistor and the balancing resistance 4. In consequence great heat yield is achieved from the balancing resistance 4 to the thermostat 2 when the heat requirement in the room is slight.

The cycle period for the thermostat 2 will then be extremely brief by reason of the relatively great heat supply from the acceleration resistance 3 and the balancing resistance 4.

With increase of the heat requirement in the room in which the heater is placed, the temperature of the heater which affects the thermistor will be higher than with low heat requirement, and the resistance in the thermistor 5 will be higher than previously due to the higher temperature so that the current through the thermistor 5 and the balancing resistance 4 will decrease, whereby the balancing resistance 4 will supply less heat to the thermostat 2. The balancing resistance will thus "equalize" the effect of the acceleration resistance and the heater's load so that the collective heat effect on the thermostat 2 is constant whether there is great or little difference between the room temperature and the temperature at which the thermostat is set.

The same equalization may be achieved by means of a thermistor with negative temperature coefficient, this must then be connected in parallel with the balancing resistance however, as illustrated in FIG. 2. The parallel connection of the balancing resistance 4 and the thermistor 5, which has negative temperature coefficient, is connected in series with a reactance 6 and the said components are connected over the circuit voltage. By means of this connection the same temperature-dependent effect is achieved from the balancing resistance 4 as in the previously described arrangement with reference to FIG. 1, where the balancing resistance and the thermistor are in series.

The examples shown serve merely to illustrate the invention and form no limitation of the protection afforded by this patent.

Having described by invention, I claim:

1. A room-temperature regulator for an electric heater, comprising:
   a thermostat means for energizing and deenergizing the heater at a predetermined temperature
   an acceleration resistance electrically connected in parallel with the heater and disposed to supply additional heat to the thermostat means,
   a balancing resistance also disposed to supply heat to the thermostat means when the heater is energized, and
   a thermistor controlled by the temperature of the heater, said thermistor being electrically connected to the balancing resistance to cause the heat supply from the balancing resistance to the thermostat will vary inversely with respect to the heat requirement in the room to be heated.

2. A room-temperature regulator according to claim 1, wherein the balancing resistance is connected in series with said thermistor which has a positive temperature coefficient.

3. A room-temperature regulator according to claim 1, wherein:
   the thermistor has a negative temperature coefficient and it is connected in parallel with said balancing resistance, and further comprising a reactance electrically connected in series with the parallel connected thermistor and balancing resistor combination.

* * * * *